(12) United States Patent
Qiu et al.

(10) Patent No.: US 11,864,592 B2
(45) Date of Patent: Jan. 9, 2024

(54) TEMPERATURE CONTROL METHOD AND ELECTRONIC CIGARETTE

(71) Applicant: Changzhou Patent Electronic Technology Co., LTD., Changzhou (CN)

(72) Inventors: Weihua Qiu, Changzhou (CN); Wanlin Cai, Changzhou (CN)

(73) Assignee: CHANGZHOU PATENT ELECTRONIC TECHNOLOGY CO., LTD., Changzhou (CN)

( * ) Notice: Subject to any disclaimer, the term of this patent is extended or adjusted under 35 U.S.C. 154(b) by 770 days.

(21) Appl. No.: 16/963,242

(22) PCT Filed: Jan. 8, 2019

(86) PCT No.: PCT/CN2019/070835
§ 371 (c)(1),
(2) Date: Jul. 19, 2020

(87) PCT Pub. No.: WO2019/141110
PCT Pub. Date: Jul. 25, 2019

(65) Prior Publication Data
US 2021/0378313 A1    Dec. 9, 2021

(30) Foreign Application Priority Data

Jan. 19, 2018  (CN) .......................... 201810053045.3

(51) Int. Cl.
*A24F 13/00*   (2006.01)
*A24F 40/50*   (2020.01)
*A24F 40/60*   (2020.01)
*A24F 40/57*   (2020.01)

(52) U.S. Cl.
CPC .............. *A24F 40/50* (2020.01); *A24F 40/57* (2020.01); *A24F 40/60* (2020.01)

(58) Field of Classification Search
CPC ........................................................ A24F 47/00
USPC ................................................. 131/328–329
See application file for complete search history.

(56) References Cited

U.S. PATENT DOCUMENTS 9,149,586 B2    10/2015  Shen et al.
2020/0368462 A1*  11/2020  Lee .......................... A24F 40/57

FOREIGN PATENT DOCUMENTS

| CN | 204120235 U | 1/2015 |
| CN | 104470386 A | 3/2015 |
| CN | 204742629 U | 11/2015 |
| CN | 107296301 A | 10/2017 |
| CN | 107440158 A | 12/2017 |

* cited by examiner

*Primary Examiner* — Phuong K Dinh
(74) *Attorney, Agent, or Firm* — Cheng-Ju Chiang

(57) ABSTRACT

A temperature control method and an electronic cigarette. The method includes: when an electronic cigarette is in a temperature holding mode, obtaining a first holding temperature corresponding to the current temperature holding mode; adjusting the holding temperature of the electronic cigarette from the first holding temperature to a second holding temperature according to adjustment reference information; and adjusting the temperature of the electronic cigarette to the holding temperature. The present application solves the problem of a few heating modes of electronic cigarettes in the prior art, and increases heating modes of electronic cigarettes.

12 Claims, 2 Drawing Sheets

Obtaining a first holding temperature corresponding to current temperature holding mode, when an electronic cigarette is in temperature holding mode  — 110

Adjusting the holding temperature of the electronic cigarette from the first holding temperature to a second holding temperature according to adjustment reference information  — 120 adjusting the temperature of the electronic cigarette to the holding temperature  — 130

TEMPERATURE CONTROL METHOD AND ELECTRONIC CIGARETTE

CROSS REFERENCE TO RELATED APPLICATION

The present application is a 35 U.S.C. § 371 National Phase conversion of International (PCT) Patent Application No. PCT/CN2019/070835, filed on Jan. 8, 2019, which is based on and claims priority of Chinese patent application No. 201810053045.3, filed on Jan. 19, 2018. The entire disclosure of the above-identified application is hereby incorporated by reference herein and made a part of this specification.

TECHNICAL FIELD

The present invention relates to the field of electronic cigarette technology, and in particular to a temperature control method and an electronic cigarette.

BACKGROUND

As an alternative to cigarettes, electronic cigarettes are increasingly popular in the market because of their safety, convenience, health and environmental protection.

At present, the electronic cigarette generates heat by controlling the heat-generating component according to a preset power or a preset temperature, thereby heating the tobacco liquid or the tobacco in the electronic cigarette, so that the smoke liquid in the electronic cigarette is atomized to generate smoke or the tobacco in the electronic cigarette is smoked to produce smoke. The smoke can be inhaled from the mouthpiece by the user of the electronic cigarette to achieve the purpose of simulating smoking.

As described above, the electronic cigarette control heating element generates heat according to a preset power or a preset temperature, and the heating mode is single.

SUMMARY

In order to solve the problem of the single heating method of the electronic cigarette in the prior art, the embodiment of the invention provides a temperature control method and an electronic cigarette. The technical solution is as follows:

In a first aspect, a temperature control method is provided, the method including:
  when the electronic cigarette is in the temperature holding mode, obtaining a first holding temperature corresponding to current temperature holding mode;
  adjusting the holding temperature of the electronic cigarette from the first holding temperature to the second holding temperature according to adjustment reference information;
  adjusting the temperature of the electronic cigarette to the holding temperature.

Optionally, the adjustment reference information includes at least one of a timing time, an operated times of the control member, a single operated time of the control member, and a cumulative operation time of the control member, wherein the timing time is the temperature of the electronic cigarette reaches the first holding temperature to the current length of time.

Optionally, the adjusting the holding temperature of the electronic cigarette from the first holding temperature to the second holding temperature includes:
  the holding temperature of the electronic cigarette is adjusted from the first holding temperature to the second holding temperature before the timing time exceeds a preset holding time.

Optionally, the adjusting the holding temperature of the electronic cigarette from the first holding temperature to the second holding temperature before the timing time exceeds a preset holding time length, including:
  controlling the holding temperature of the electronic cigarette to be the first holding temperature when the timing time is not higher than a first time;
  adjusting the holding temperature of the electronic cigarette to the second holding temperature when the timing time exceeds the first time and does not exceed a preset second time.

Optionally, the adjusting the holding temperature of the electronic cigarette from the first holding temperature to the second holding temperature includes:
  calculating a difference between the second holding temperature and the first holding temperature to obtain a temperature difference;
  calculating a first adjustment step according to the holding time and the temperature difference;
  adjusting the holding temperature of the electronic cigarette through the first adjustment step when the timing time increases each one of the unit time.

Optionally, the adjusting the holding temperature of the electronic cigarette from the first holding temperature to the second holding temperature includes:
  when the holding temperature of the electronic cigarette is not the second holding temperature, and each time the detected number of operated times of the control member is increased, determining a temperature adjustment value according to the number of operated times, and controlling the holding temperature of the electronic cigarette changes one of the temperature adjustment value; or
  each time the detected number of operated times of the control member is increased, controlling the temperature of the electronic cigarette change a second adjustment step, and the second adjustment step is a ratio of a temperature difference and a preset upper limit operated time, the temperature difference being a difference between the second holding temperature and the first holding temperature.

Optionally, the adjusting the holding temperature of the electronic cigarette from the first holding temperature to the second holding temperature includes:
  controlling the holding temperature of the electronic cigarette to be a target temperature corresponding to the cumulative operated time, and the corresponding target temperature being the second holding temperature when the cumulative operated time is the holding time; or,
  controlling the holding temperature of the electronic cigarette be a target temperature corresponding to the single operated time, and the corresponding target temperature being the second holding temperature when the single operated time is the holding time.

Optionally, the method further includes:
  presenting a first reminder message when detecting an operation signal generated when the control member is operated, or when the heat retention temperature of the electronic cigarette is updated, the first reminder message is used to prompt whether the timing time is to be cleared;

when the clear confirmation signal is received, the timing time is cleared and re-accumulated.

Optionally, when the holding temperature of the electronic cigarette reaches the first holding temperature, displaying a second reminding message, the second reminding message is used to prompt the user that the holding temperature of the electronic cigarette reaches the first holding temperature.

Optionally, the method further includes:

presenting the holding temperature of the electronic cigarette; and/or, presenting timing time; and/or, presenting remaining operated time or the single operated time or the cumulative operated time, and the remaining operated time being the difference between the operation times and the operated times.

In a second aspect, an electronic cigarette is provided, the electronic cigarette includes:

a memory and processor;

storing at least one program instruction in the memory;

the processor, by loading and executing the at least one program instruction, implements the temperature control method of the first aspect and any alternative embodiment of the first aspect.

In a third aspect, a computer readable storage medium is provided, the one or more instructions stored in a computer readable storage medium, the one or more instructions being executed by a processor within an electronic cigarette to implement temperature control method according to the first aspect and any alternative embodiment of the first aspect.

The beneficial effects brought by the technical solutions provided by the embodiments of the present invention are:

the first holding temperature corresponding to the current temperature holding mode is obtained when the electronic cigarette is in the temperature holding mode; and the holding temperature of the electronic cigarette is adjusted from the first holding temperature to the second holding temperature according to the adjustment reference information; the temperature is adjusted to the holding temperature. The problem of single heating mode of the electronic cigarette in the prior art is solved, and the effect of enriching the heating mode of the electronic cigarette is achieved.

BRIEF DESCRIPTION OF THE DRAWINGS

In order to more clearly explain the technical solutions in the embodiments of the present invention, the drawings required in the description of the embodiments will be briefly introduced below. Obviously, the drawings in the following description are only some embodiments of the present invention. For those of ordinary skill in the art, without paying any creative work, other drawings can be obtained based on these drawings.

DETAILED DESCRIPTION OF PREFERRED EMBODIMENTS

The embodiments of the present invention will be further described in detail below with reference to the accompanying drawings.

Figure 1:
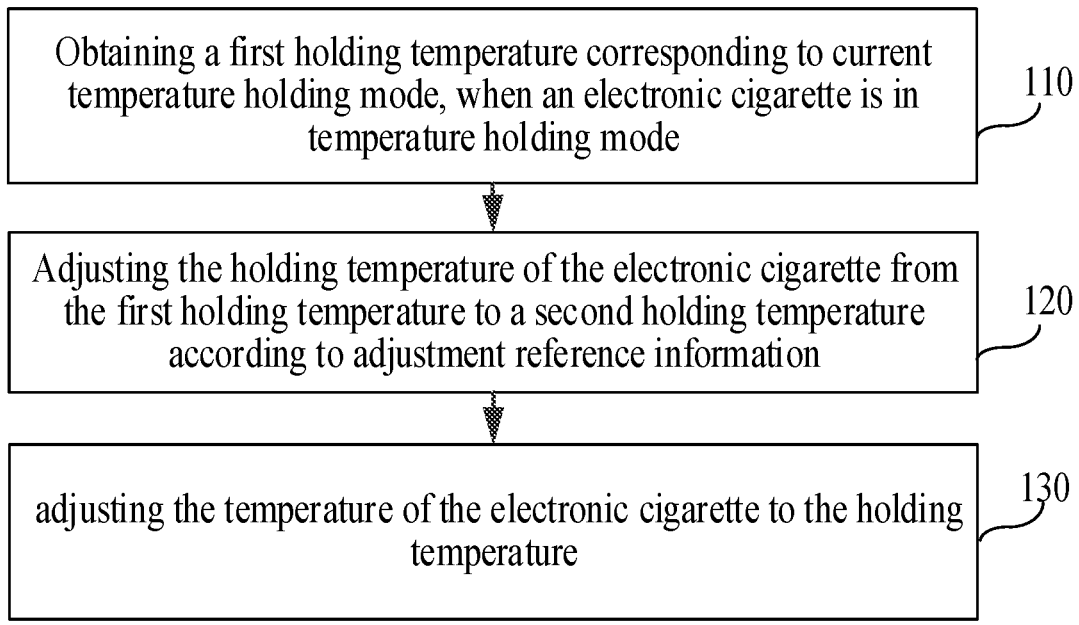
FIG. 1 is a flow chart of a method of a temperature control method according to an embodiment of the present invention.

Please refer to FIG. 1, which shows a flow chart of a method of temperature control method provided by an embodiment of the present invention. As shown in FIG. 1, the temperature control method may include:

Step 110, Obtaining a first holding temperature corresponding to current temperature holding mode, when an electronic cigarette is in temperature holding mode.

Step 120, Adjusting the holding temperature of the electronic cigarette from the first holding temperature to a second holding temperature according to adjustment reference information.

Step 130, adjusting the temperature of the electronic cigarette to the holding temperature.

In the case where the electronic cigarette is in the temperature holding mode, the electronic cigarette controls the temperature to be the holding temperature or close to the holding temperature. The temperature of the electronic cigarette may be the temperature of the heating element in the electronic cigarette, or the temperature of the heating chamber in the electronic cigarette.

It should be noted that in the embodiment of the present invention, the electronic cigarette adjusts the temperature of the electronic cigarette to the temperature corresponding to the holding temperature in real time.

In summary, the method provided by the embodiment of the present invention obtains the first holding temperature corresponding to the current temperature holding mode when the electronic cigarette is in the temperature holding mode; and according to the adjustment reference information, the holding temperature of the electronic cigarette is adjusted from the first the holding temperature to the second holding temperature; the temperature of the electronic cigarette is adjusted to the holding temperature. The problem of single heating mode of the electronic cigarette in the prior art is solved, and the effect of enriching the heating mode of the electronic cigarette is achieved.

Figure 2:
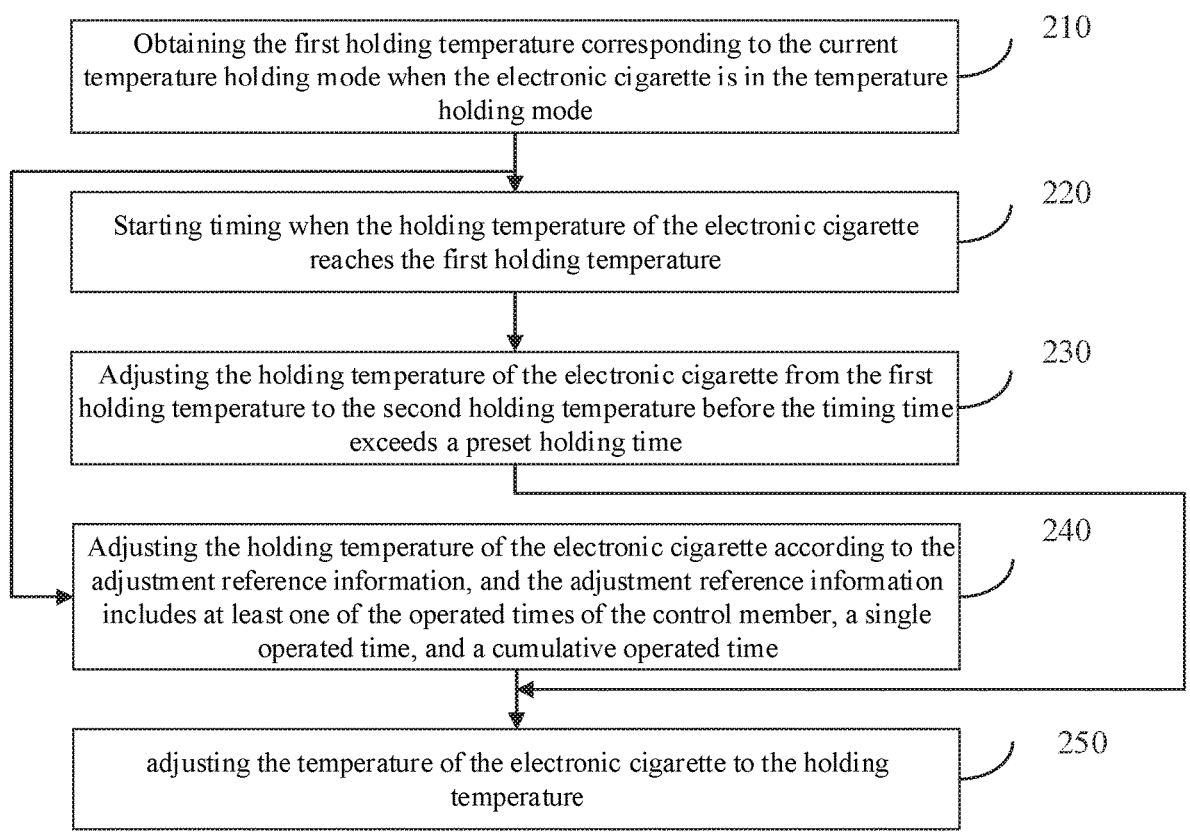
FIG. 2 is a flow chart of a method of a temperature control method according to another embodiment of the present invention.

Please refer to FIG. 2, which shows a flow chart of a method of temperature control method provided by another embodiment of the present invention. As shown in FIG. 2, the temperature control method may include:

Step 210, Obtaining the first holding temperature corresponding to the current temperature holding mode when the electronic cigarette is in the temperature holding mode.

The first holding temperature corresponding to the current temperature holding mode refers to the temperature of the electronic cigarette when the electronic cigarette enters the temperature holding mode. The temperature of the electronic cigarette mentioned here may be the temperature of the heating element in the electronic cigarette, or the temperature of the heating chamber in the electronic cigarette.

Electronic cigarettes can enter the temperature holding mode in two ways:

Firstly, controlling the electronic cigarette to enter the temperature holding mode when receiving the selection signal for selecting the temperature holding mode. For example, after the electronic cigarette is turned on, the user can trigger the electronic cigarette to enter the temperature holding mode by pressing the key for 5 seconds.

Second, when the temperature of the electronic cigarette reaches a predetermined temperature, the electronic cigarette is automatically controlled to enter the temperature holding mode. The predetermined temperature mentioned here can be set by the system developer or can be customized by the user. Optionally, the predetermined temperature set by the system developer before the electronic cigarette is put on the market, for example, may be set to 165 degrees Celsius.

In actual implementation, the temperature of the electronic cigarette can be obtained in two ways:

Firstly, the temperature data collected by the temperature collecting device is obtained to obtain the temperature of the electronic cigarette, and the temperature collecting device can be disposed on the surface of the heating element or in the heating cavity.

Secondly, the resistance value of the heating element is detected, and the temperature of the heating element is determined according to the resistance value of the heating element, to obtain the temperature of the electronic cigarette.

It should be noted that the electronic cigarette can pre-store the correspondence between the heating temperature of the heating element and the resistance value of the heating element; when the resistance value of the heating element is obtained, the heating temperature corresponding to the resistance value is determined as the temperature of the electronic cigarette. In addition, the temperature of the electronic cigarette may be the temperature of the heating element or the temperature of the heating chamber, which is not limited herein.

Optionally, when receiving the power-on signal, the electronic cigarette controls the heat element inside the electronic cigarette generate heat and simultaneously detects the temperature of the electronic cigarette, and raises the temperature of the electronic cigarette to a predetermined temperature to trigger the electronic cigarette to enter the temperature holding mode. For example, when the on-off key of the electronic cigarette is continuously pressed for 3 seconds, a power-on signal is generated, and the electronic cigarette controls the heat generation of the heat element according to the power-on signal, and simultaneously detects the temperature of the electronic cigarette, and raises the temperature of the electronic cigarette to a predetermined temperature to trigger the electronic cigarette to enter the temperature holding mode.

Optionally, when the electronic cigarette receives the starting signal after the power is turned on, the internal heating element of the electronic cigarette is controlled to generate heat, and the temperature of the electronic cigarette is detected, so that the temperature of the electronic cigarette is raised to a predetermined temperature to trigger the electronic cigarette to enter the temperature holding mode. For example, when the electronic cigarette is turned on, the on-off key generates a starting signal when it is first pressed. The electronic cigarette controls the heating of the heating element according to the starting signal, and simultaneously detects the temperature of the electronic cigarette, so that the temperature of the electronic cigarette rises to the predetermined temperature to trigger the electronic cigarette to enter to the temperature holding mode.

After step 210 is performed, step 220 or step 240 is performed.

Step 220, Starting timing when the holding temperature of the electronic cigarette reaches the first holding temperature.

In actual implementation, if the electronic cigarette automatically enters the temperature holding mode when its temperature rises to the predetermined temperature (i.e., the first holding temperature), the electronic cigarette may start timing when its temperature reaches the predetermined temperature; if the electronic cigarette enters the temperature holding mode according to the selection signal for selecting the temperature holding mode, the electronic cigarette can start timing when receiving the selection signal, and determine the temperature of the electronic cigarette at this time as the first holding temperature; optionally, after the electronic cigarette receives the selection signal, starting to timing until the temperature of the electronic cigarette reaches the first holding temperature.

The timing in this step can be counted by using a timer, or can be timed by using a software program, which is not specifically limited in this embodiment. The timing time of the timing obtained in this step is the adjustment reference information, and the electronic cigarette can adjust the holding temperature of the electronic cigarette from the first holding temperature to the second holding temperature according to the timing time, as shown in step 230.

Step 230, Adjusting the holding temperature of the electronic cigarette from the first holding temperature to the second holding temperature before the timing time exceeds a preset holding time.

The holding time and the second holding temperature can be set by the system developer respectively, or can be customized by the user. The second holding temperature involved in the present application may be an upper holding temperature higher than the first holding temperature, or may be a lower holding temperature lower than the first holding temperature. This embodiment is exemplified by the second holding temperature being higher than the upper holding temperature of the first holding temperature.

Optionally, the second holding temperature set by the system developer before the electronic cigarette is put on the market, for example, can be set to 200 degrees Celsius. In actual implementation, when the user can customize the holding time, the system developer can set the value range of the holding time, and the user can select a value from the range of values as the holding time. For example, the value range can be [10,300]. Optionally, the holding time set by the system developer before the electronic cigarette is put on the market, for example, can be set to 180 s.

This step can be achieved in the following ways:

Firstly, when the timing time is no longer than the first time, the temperature of electronic cigarette is controlled as the first temperature. When the timing time is longer than the first time and does not exceed the preset second time, adjust the holding temperature of electronic cigarette to the second holding temperature; when the timing time is longer than the second time and not longer than the first holding time holding time, the heating temperature holding temperature of the electronic cigarette is controlled to be the second holding temperature; Where, the first time is the product of the holding time and the first ratio, and the second time is the product of the holding time and the second ratio, and the first ratio is smaller than the second ratio.

Optionally, in a possible implementation manner, when the second time and the holding time are equal, the holding temperature of the electronic cigarette is adjusted from the first holding temperature to the second holding temperature.

The holding time is 100 seconds, the first ratio is 0.1, and the second ratio is 0.9. The first time is 10 seconds and the second time is 90 seconds. When the electronic cigarette detects that the temperature of the electronic cigarette reaches the first holding temperature which is 165 degrees Celsius, it automatically enters the temperature holding mode and controls the electronic cigarette to output at 165 degrees Celsius within 10 seconds; then, the holding temperature of the electronic cigarette is raised to 200 degrees Celsius within 80 seconds which is the preset upper limit holding temperature, and the output is continuously continued within the 80 seconds; finally, the control electronic cigarette is continuously outputted for 10 seconds according to the holding temperature is 200 degrees Celsius.

For example, the holding time is 100 seconds, the first ratio is 0.1, and the second ratio is 0.9. The first time is 10 seconds and the second time is 90 seconds. When the electronic cigarette detects that the temperature of the electronic cigarette reaches the first holding temperature which is 165 degrees Celsius, it automatically enters the temperature holding mode and controls the electronic cigarette to output at 165 degrees Celsius within 10 seconds; then, the electronic cigarette is controlled within 80 seconds. The holding temperature is lowered to the preset lower limit holding temperature which is 140 degrees Celsius, and the output is continuously continued within the 80 seconds; finally, the control electronic cigarette is continuously outputted for 10 seconds according to the holding temperature which is 140 degrees Celsius.

For the implementation of controlling the temperature of the electronic cigarette to be adjusted from the first holding temperature to the second holding temperature, reference may be made to the second embodiment, that is, the first temperature time in the second embodiment is replaced by the difference of the second time and the first time.

Secondly, calculating a difference between the second holding temperature and the first holding temperature to obtain a temperature difference, and calculating a first adjustment step according to a preset unit time, a holding time and the temperature difference; and the temperature of the electronic cigarette is adjusted through a first adjustment step when the timing time increases each one of the unit time.

The unit time is usually set by the system developer. For example, the unit time can be set to 1 s, 0.1 s, 0.5 s, etc.; the first adjustment step is calculated according to the preset unit time, the holding time, and the temperature difference. The specific implementation may be: calculating a ratio of the unit time to the holding time; calculating the product of the temperature difference and the ratio to obtain the first adjustment step.

Optionally, adjusting the holding temperature of the electronic cigarette through a first adjustment step may be: increasing the holding temperature of the electronic cigarette by a first adjustment step when the timing time increases each one of the unit time; or the holding time of the electronic cigarette is reduced by a first adjustment step when the timing time increases each one of the unit time.

For example, the unit time is 1 s, the first holding temperature is 165 degrees Celsius, the upper holding temperature is 200 degrees Celsius, and the holding time is 35 seconds. The first adjustment step is 1 degree Celsius. After detecting the temperature of the holding temperature reached 165 degrees Celsius, the electronic cigarette increased its holding temperature by 1 degree Celsius every 1 s; after 35 seconds, the holding temperature of the electronic cigarette increased to a second holding temperature which is 200 degrees Celsius.

For example, the unit time is 1 s, the first holding temperature is 165 degrees Celsius, the upper limit holding temperature is 140 degrees Celsius, and the holding time is 25 seconds. The first adjustment step is −1 degree Celsius. After detecting the holding temperature reaches 165 degrees Celsius, the electronic cigarette reduces its holding temperature by 1 degree Celsius every 1 s; after 25 seconds, the holding temperature of the electronic cigarette is lowered to the second holding temperature which is 140 degrees Celsius.

Step 240: Adjusting the holding temperature of the electronic cigarette according to the adjustment reference information, and the adjustment reference information includes at least one of the operated times of the control member, a single operated time, and a cumulative operated time.

Wherein, the control member is a component on the electronic cigarette having the function of controlling the electronic cigarette, for example, the control member can be an on-off key on the electronic cigarette. This embodiment is exemplified by the control member as an on-off key when exemplifying.

Optionally, the electronic cigarette is continuously insulated before the timing time exceeds the holding time; when the timing time exceeds the holding time, the electronic cigarette stops outputting according to the holding temperature.

Optionally, if the timing time does not exceed the holding time and the holding temperature of the electronic cigarette is lower than the upper holding temperature, the holding temperature of the electronic cigarette is raised according to the adjustment reference information.

Optionally, in the case that the timing time does not exceed the holding time, and the holding temperature of the electronic cigarette is higher than the lower limit holding temperature, the holding temperature of the electronic cigarette is lowered according to the adjustment reference information.

In this step, adjusting the holding temperature of the electronic cigarette according to the adjustment reference information can be realized in the following ways:

In the first type, the temperature of the control element of the electronic cigarette is increased by a second adjustment step every time when the number of the operated times of the control member is increased, and the second adjustment step is a ratio of the temperature difference to the preset upper limit operated time. The temperature difference is the difference between the second holding temperature and the first holding temperature.

The preset upper limit operated time can be set by the system developer or can be customized by the user. In actual implementation, when the user can customize the upper limit operated times, the system developer can set the value range of the upper limit operated times, and the user can select a value from the value range as the upper limit operated times. For example, the value range can be [2, 30]. Optionally, the upper limit operated times set by the system developer before the electronic cigarette is put on the market, for example, can be set to 12 times.

The specific implementation may be: calculating a difference between the second holding temperature and the first holding temperature to obtain a temperature difference, and calculating a ratio of the temperature difference to the upper limit operated times to obtain the second adjustment step; each time the electronic cigarette detects the number of operated times increased, the holding temperature of the control electronic cigarette is adjusted by a second adjustment step.

Wherein, controlling the holding temperature of the electronic cigarette to adjust a second adjustment step may be: controlling the holding temperature of the electronic cigarette to increase by a second adjustment step, or reducing the holding temperature of the electronic cigarette by a second adjustment step.

For example, if the first holding temperature is 165 degrees Celsius and the upper holding temperature is 200 degrees Celsius, the temperature difference is 35 degrees Celsius; if the upper limit operated times is 7, the second adjustment step is 5 degrees Celsius; when the number of times the pressed key is detected is increased, the holding temperature of the electronic cigarette is increased by 5 degrees Celsius. That is, in the 100 s after the electronic cigarette's holding temperature reaches 165 degrees Celsius, the user can increase the holding temperature of the electronic cigarette by 5 degrees Celsius by pressing the on-off key until the holding temperature of the electronic cigarette reaches 200 degrees Celsius.

Optionally, the electronic cigarette is continuously hold before the timing time does not exceed the holding time; when the timing time exceeds the holding time, the electronic cigarette stops holding according to the holding temperature.

Secondly, in the case that the holding temperature of the electronic cigarette is not the second holding temperature, each time the number of the operated times of the control member is detected increases, the temperature adjustment value is determined according to the number of the operated times, and the holding temperature of the electronic cigarette is adjusted by the temperature adjustment value.

The adjustment of the temperature of the electronic cigarette to the temperature adjustment value may be: increasing the temperature of the electronic cigarette by the temperature adjustment value, or lowering the temperature of the electronic cigarette by the temperature adjustment value.

The specific implementation may be: when it is detected that the number of the operated times of the control member is increased to n (n is a positive integer), the initial adjustment value is multiplied by $1/a^n$ (a is a positive integer) to obtain the temperature adjustment value, and the holding temperature of the electronic cigarette is increased by one temperature adjustment value. Among them, the initial adjustment value can be set by the system developer, or can be customized by the user; the initial adjustment value is not 0, it can be positive or negative.

Optionally, when the step is implemented in the first or second manner, the electronic cigarette further performs the following steps: presenting the first reminder message, when detecting an operation signal generated when the control member is operated, the first reminder message is used to prompt whether the timing time is to be cleared. when a clear confirmation signal is received, the timing time is cleared and re-accumulated.

Taking the holding time as 30 s as an example, when the operation signal generated when the control member is operated is detected, the first reminder message, the confirmation controller, and the denial control are presented, and the first reminder message is used to prompt whether to clear the timing time; If it is detected that the confirmation controller is triggered, it is considered that the clear confirmation signal is received, the timing is cleared to 0, and the time is 1 s after 1 s, and the electronic cigarette can be kept for 29 s. If it is detected that the deny controller is triggered, the timing is continued, and the timing is not cleared. For example, when the detection of the deny controller is triggered, the timing is 10 s, and after 1 s, the elapsed time is 11 s, and the electronic cigarette can be kept for 19 s.

Thirdly, the holding temperature for controlling the electronic cigarette is the target temperature corresponding to the accumulated operated time, and the corresponding target temperature when the accumulated operated time reaches the holding time is the second holding temperature. The accumulated operated time and the target temperature may be positively or negatively correlated, and the correspondence between the operated time and the target temperature is pre-stored in the electronic cigarette.

Fourthly, the holding temperature for controlling the electronic cigarette is the target temperature corresponding to the single operated time, and the corresponding target temperature is the second holding temperature when the single operated time reaches the holding time. The single operated time and the target temperature may be positively or negatively correlated, and the correspondence between the single operated time and the target temperature is pre-stored in the electronic cigarette.

Optionally, when the third method or the fourth implementation is used in this step, the electronic cigarette further performs the following steps: when the temperature of the electronic cigarette is updated, the first reminding message and the confirmation controller are presented, and the first reminding message is used for prompt whether to clear the timing time; when it is detected that the confirmation controller is triggered, the timing time is cleared.

The fifthly, obtains the holding time set by the user; when the holding time is lower than the preset third time, the fourth method is adopted to adjust the holding temperature of the electronic cigarette according to the adjustment reference information; when the holding time is equal to or higher than the first time, the third method is adopted to adjust the holding temperature of the electronic cigarette according to the adjustment reference information.

The third time can be set by the system developer or can be customized by the user. For example, the third duration can be 5 s.

For example, the third time is 5 s, the user can select the preset time in [3, 90]; when the preset time is less than 5 s, it is considered that the user wants the holding temperature to change with the single operated time. The fourth implementation adjusts the holding temperature of the electronic cigarette according to the adjustment reference information; when the preset time is equal to or higher than the third time, it is considered that the user wants the holding temperature to change according to the accumulated operated time, and adopts the fourth method to realize that adjusting the holding temperature of the electronic cigarette according to the adjustment reference information.

Step 250, adjusting the temperature of the electronic cigarette to the holding temperature.

In the case where the electronic cigarette is in the temperature holding mode, the electronic cigarette controls the temperature to be the holding temperature or close to the holding temperature. The temperature of the electronic cigarette may be the temperature of the heating element in the electronic cigarette, or the temperature of the heating chamber in the electronic cigarette.

In actual implementation, the electronic cigarette can detect its temperature. When its temperature is lower than the holding temperature, the heating power of the heating element can be increased to increase its temperature; when the temperature is higher than the holding temperature, there are some operation such as controlling the heating element stop can be used to reduces the temperature of the electronic cigarette.

In summary, the method provided by the embodiment of the present invention obtains the first holding temperature corresponding to the current temperature holding mode when the electronic cigarette is in the temperature holding mode; and according to the adjustment reference information, the holding temperature of the electronic cigarette is adjusted from the first holding temperature to the second holding temperature; the temperature of the electronic cigarette is adjusted to the holding temperature. The problem of single heating mode of the electronic cigarette in the prior art is solved, and the effect of enriching the heating mode of the electronic cigarette is achieved.

In one example, before the timing time exceeds the preset holding time, after the holding temperature of the electronic cigarette is adjusted to the second holding temperature, the electronic cigarette is output at the holding temperature is the second holding temperature.

In one example, when the holding temperature of the electronic cigarette reaches the first holding temperature, a second reminding message is presented, and the second reminding message is used to prompt the user that the holding temperature of the electronic cigarette reaches the first holding temperature.

The present manner of the second reminder message may be an electronic cigarette vibration, a text prompt, a voice prompt, a buzzer alarm, etc., which is not specifically limited in this embodiment.

In one example, the electronic cigarette increases its holding temperature to a first holding temperature, displaying a prompt message for prompting the user that the temperature is increasing.

The display of the reminder message may be performed by displaying an upward arrow, displaying an upward arrow, a text prompt, a voice prompt, and the like at the displayed thermometer, which is not specifically limited in this embodiment.

In one example, the holding temperature of the electronic cigarette is displayed; and/or, the timing time is displayed; and/or, the remaining operated times or the single operated time or the cumulative operated time is displayed, and the remaining operated times is the difference between the the upper operated times and the operated times.

An embodiment of the present invention also provides an electronic cigarette including a processor and a memory for executing a computer program instruction to complete a processor of various processes and methods for storing program instructions, the processor can implement the temperature control method involved in any of the above embodiments by executing the program instructions.

An embodiment of the present invention further provides a computer readable storage medium having stored therein one or more instructions that are implemented by a processor within an electronic cigarette to implement the temperature control method involved in any of the above embodiments.

The serial numbers of the embodiments of the present invention are merely for the description, and do not represent the advantages and disadvantages of the embodiments.

A person skilled in the art may understand that all or part of the steps of implementing the above embodiments may be completed by hardware, or may be instructed by a program to execute related hardware, and the program may be stored in a computer readable storage medium. The storage medium mentioned may be a read only memory, a magnetic disk or an optical disk or the like.

The above are only preferred embodiments of the present invention and are not intended to limit the present invention. Any modification, equivalent replacement, improvement, etc. made within the spirit and principle of the present invention shall be included in the protection scope of the present invention.

What is claimed is:

1. A temperature control method, wherein the method comprises:
   obtaining a first holding temperature corresponding to current temperature holding mode, when an electronic cigarette is in temperature holding mode;
   adjusting the holding temperature of the electronic cigarette from the first holding temperature to a second holding temperature according to adjustment reference information;
   adjusting the temperature of the electronic cigarette to the second holding temperature wherein the adjustment reference information comprises operated times of a control;
   wherein the adjusting the holding temperature of the electronic cigarette from the first holding temperature to the second holding temperature comprises:
   when the holding temperature of the electronic cigarette is not the second holding temperature, and each time the detected number of operated times of the control member is increased, determining a temperature adjustment value according to the number of operated times, and controlling the holding temperature of the electronic cigarette changes one of the temperature adjustment value; or
   each time the detected number of operated times of the control member is increased, controlling the temperature of the electronic cigarette change a second adjustment step, and wherein the second adjustment step is a ratio of a temperature difference and a preset upper limit operated time, the temperature difference is a difference between the second holding temperature and the first holding temperature.

2. The method according to claim 1, wherein the adjustment reference information further comprises at least one of timing time, a single operated time of the control member, and a cumulative operated time of the control member, the timing time is the length of time between the temperature of the electronic cigarette reaches the first holding temperature and the current time.

3. The method according to claim 2, wherein the adjusting the holding temperature of the electronic cigarette from the first holding temperature to a second holding temperature comprises:
   the holding temperature of the electronic cigarette is adjusted from the first holding temperature to the second holding temperature before the timing time exceeds a preset holding time.

4. The method according to claim 3, wherein the adjusting the holding temperature of the electronic cigarette from the first holding temperature to the second holding temperature before the timing time exceeds a preset holding time, comprising:
   controlling the holding temperature of the electronic cigarette to be the first holding temperature when the timing time is not higher than a first time;
   adjusting the holding temperature of the electronic cigarette to the second holding temperature when the timing time exceeds the first time and does not exceed a preset second time;
   wherein, the first time is the product of the holding time and the first ratio, and the second time is the product of the holding time and the second ratio, and the first ratio is smaller than the second ratio.

5. The method according to claim 2, wherein the adjusting the holding temperature of the electronic cigarette from the first holding temperature to a second holding temperature comprises:
   calculating a difference between the second holding temperature and the first holding temperature to obtain a temperature difference;
   calculating a first adjustment step according to the holding time and the temperature difference;
   adjusting the holding temperature of the electronic cigarette through the first adjustment step when the timing time increases each one of the unit time.

6. The method according to claim 2, wherein the adjusting the holding temperature of the electronic cigarette from the first holding temperature to the second holding temperature comprises:
controlling the holding temperature of the electronic cigarette to be a target temperature corresponding to the cumulative operated time, and the corresponding target temperature being the second holding temperature when the cumulative operated time is the holding time; or,
controlling the holding temperature of the electronic cigarette be a target temperature corresponding to the single operated time, and the corresponding target temperature being the second holding temperature when the single operated time is the holding time.

7. The method according to claim 1, wherein the method further comprises:
presenting a first reminder message when detecting an operation signal generated when the control member is operated, or when the heat holding temperature of the electronic cigarette is updated, the first reminder message is used to prompt whether the timing time is to be cleared;
when a clear confirmation signal is received, clearing and re-accumulating the timing time.

8. The method according to claim 1, wherein when the holding temperature of the electronic cigarette reaches the first holding temperature, presenting a second reminding message, and the second reminding message is used for prompting an user that the holding temperature of the electronic cigarette of reaches the first holding temperature.

9. The method according to claim 1, wherein the method further comprises:
presenting the holding temperature of the electronic cigarette; and/or,
presenting timing time; and/or,
presenting remaining operated time or the single operated time or the cumulative operated time, and the remaining operated time being the difference between the operation times and the operated times.

10. An electronic cigarette, wherein the electronic cigarette comprises:
a memory and processor;
storing at least one program instruction in the memory;
the processor, by loading and executing the at least one program instruction, implements the temperature control method of claim 1.

11. A computer readable storage medium, having stored therein one or more instructions, wherein the one or more instructions are executed by a processor within an electronic cigarette to implement the temperature control method according to claim 1.

12. The method according to claim 6, wherein the method further comprises:
presenting a first reminder message when detecting an operation signal generated when the control member is operated, or when the heat holding temperature of the electronic cigarette is updated, the first reminder message is used to prompt whether the timing time is to be cleared;
when a clear confirmation signal is received, clearing and re-accumulating the timing time.

* * * * *